UNITED STATES PATENT OFFICE.

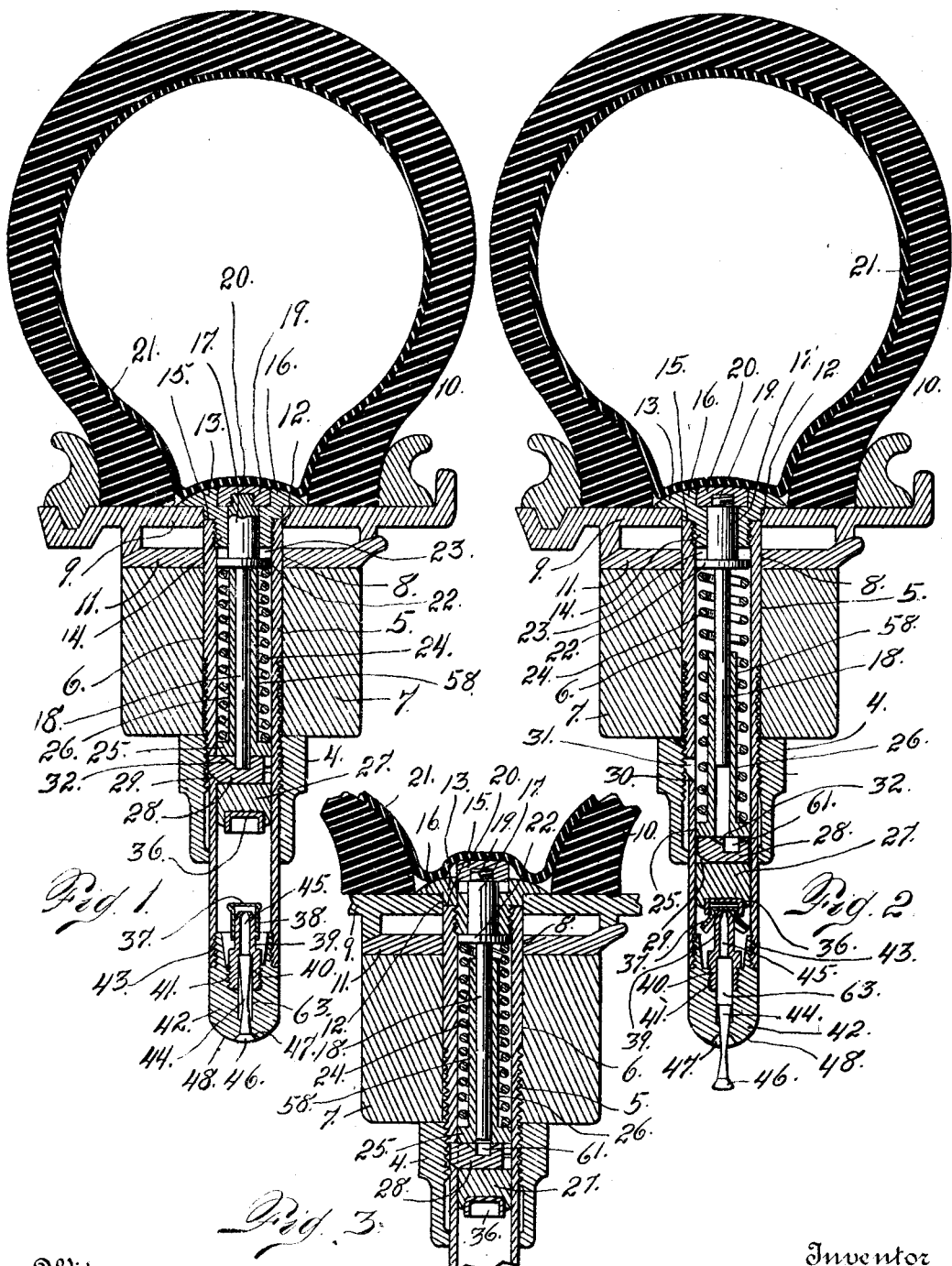

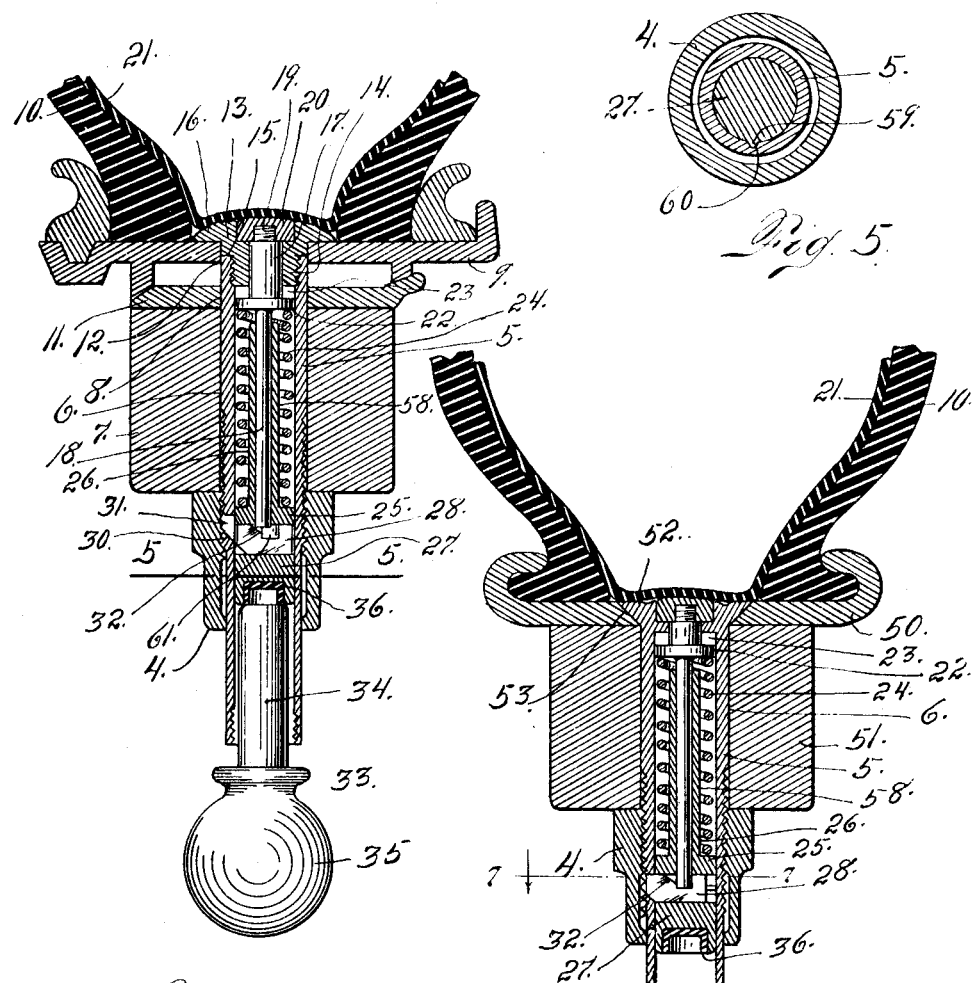

CHARLES C. CLEVELAND, OF BOULDER, COLORADO.

COMBINED TIRE-PRESSURE INDICATOR AND SIGNAL.

1,071,880.    Specification of Letters Patent.    Patented Sept. 2, 1913.

Application filed April 6, 1912. Serial No. 688,952.

*To all whom it may concern:*

Be it known that I, CHARLES C. CLEVELAND, a citizen of the United States, residing at Boulder, in the county of Boulder and State of Colorado, have invented certain new and useful Improvements in Combined Tire-Pressure Indicators and Signals; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in devices adapted to notify the person in charge of the vehicle when a tire has lost a sufficient amount of air to require re-inflation.

It is well known that the use of a soft tire is exceedingly injurious to the tire and it very often happens that a machine, as an automobile, will be run a considerable distance after one or more of the tires are too soft for use without serious damage. Where my improved construction is employed, provision is made for producing an alarm as soon as the pressure on the inner tube of the tire is reduced beyond a predetermined limit.

My improved device is of such construction that as soon as the tire yields sufficiently to indicate that its loss of air has reached the danger limit, a normally locked hammer will be released and act upon an explosive cap mounted upon a firing-pin whereby the cap is exploded with sufficient noise to notify the person in charge of the machine. At the same time an indicator is driven out of the exposed or free extremity of the device by the force of the explosion of the cap, the said indicator fitting sufficiently tightly in the end of the device to maintain its position of adjustment. In other words, when the indicator is driven out and exposed at the free extremity of the device by the explosive force resulting from the explosion of the cap, it will remain in this position so that when the person in charge of the machine examines the tires after hearing the alarm, he will understand which tire needs inflation since the projecting indicator appeals to the eye while the explosion of the cap is an audible alarm. The indicator therefore supplements the audible-alarm feature.

My improved pressure indicator and signal is connected with the rim of the tire, one extremity passing therethrough and being located in direct contact with the inner tube of the tire. This part which engages the tire is spring-actuated and when the normal pressure of the tire is maintained, the tire acting on the spring-actuated member holds the latter in such position that it locks a hammer acted on by the same spring against movement to explode a cap mounted on the firing-pin. When, however, the pressure of the tire becomes less than a predetermined degree whereby the part of the device which is in contact therewith is allowed to indent the tire, the spring-actuated locking-device moves sufficiently to release the hammer and the latter acts on the cap to produce the alarm.

Having briefly outlined my improved construction, I will proceed to describe the same in detail, reference being made to the accompanying drawing in which is illustrated an embodiment thereof.

In this drawing: Figure 1 is a longitudinal sectional view of my improved pressure indicator and signal, the same being shown in connection with the wheel-rim and its tire, the latter being shown in cross-section. In this view, the pressure indicator and alarm is shown in the locked position, the pressure of the tire being sufficient to retain the hammer in position to prevent it from acting on the explosive cap. Fig. 2 is a similar view showing the hammer in position after it has acted to explode the cap. Fig. 3 is a similar view, but partly broken away, showing the position of the parts as soon as the tire has softened sufficiently to allow the part of the device in contact therewith, to indent the tire and release the hammer. In this view, the position of the parts is that immediately after the release and before the hammer has been driven by the spring into contact with the cap. Fig. 4 is a view similar to Fig. 3, but illustrating a tool for use in assembling the parts of my improved device in connection with a wheel whose tire is to be protected. Fig. 5 is a cross-section taken on the line 5—5 Fig. 4, the parts being shown on a larger scale. Fig. 6 is a view similar to Fig. 1 but showing a slightly modified form of construction. Fig. 7 is a cross-sectional view taken upon the line 7—7, Fig. 6.

The same reference characters indicate the same parts in all the views.

Let the numeral 5 designate a tube considered in its entirety, the same being inserted in an opening 6 formed in the rim 7 of a wheel, the tube being equipped with a nut 4 threaded thereon to engagement with the rim, this rim having an outer metallic band 11 provided with a registering opening 8 through which the tube also passes. As shown in Figs. 1 to 4 inclusive, the rim of the wheel is equipped with a laterally movable band 9 upon which the tire 10 is mounted. In constructions of this character, the tire is applied to the member 9, after which this member is put in place upon the band 7 of the rim and suitably secured against lateral movement. In Figs. 1 to 4 of the drawing, my improved device is shown applied to wheels having this laterally-movable tire-holding member. This member 9 has an opening 12 which the inner extremity of the tube 5 enters, a head 13 having a threaded nipple 14 threaded into the inner extremity of the tube, the head having a shoulder 15 engaging the inner end of the tube. The head also extends laterally beyond the circumference of the tube, as shown at 16, and engages the tire-holding member 9. Through this nipple, which is open for the purpose, passes an enlarged extremity 17 of a rod 18, this enlarged extremity having a reduced threaded end 19 to which is applied a nut 20 forming a cap whose inner extremity is smooth and comes in direct contact with the inner tube 21 of the tire. When the latter is inflated to the desired degree, it acts to hold the cap 20 flush, or approximately flush, with the head 13 of the tube. In this event a collar 22 located at the outer extremity of the part 17 of the rod and of sufficient size to fill the tube, is held away from the outer extremity of the head 13, a space 23 being in this event left between the collar and the threaded nipple of the said head.

The rod 18 beyond the collar 22 is surrounded by a spiral spring 24, one extremity of which acts upon the collar while the other extremity acts upon the shoulder 25 of a hammer 26, the said shoulder being formed at the junction of the head 27 of the hammer and its hollow stem or shank 58 into which the rod 18 telescopes freely. Within the head 27 of the hammer is located a laterally movable dog 28 which is exteriorly beveled at one extremity as shown at 29, the said bevel, when the dog is in position to lock the hammer against movement, being in engagement with a correspondingly beveled part 30 of the tube 5, the said beveled part being adjacent an opening 31 in the tube which the beveled end of the dog enters when the hammer is in the locked position. This dog is provided with a recess 61 adapted to receive the outer extremity of the rod 18 which locks the dog in position to secure the hammer against acting on the cap. Adjacent the recess 61 is an interiorly-located beveled wall 32 formed on the dog and on which the outer extremity of the rod 18 acts when the hammer is forced inwardly by means of a tool 33 having a shank 34 of a size to enter the tube and an exposed knob 35 for convenience of manipulation. The outer extremity of the hammer is provided with a hollow steel member 36 adapted to engage the head 37 of an explosive cap 38 which is applied to the inner extremity 39 of a firing pin 40 which is threaded into a recess 41 formed in the inner extremity of a plug 42, the latter being threaded into the outer extremity of the tube 5 as shown at 43. This plug has a longitudinal bore 63 in which is inserted an indicating pin 44 which normally fits the bore sufficiently tightly to maintain its inward position until the cap is exploded, in which event the force of the explosion drives the indicating pin outwardly (see Fig. 2), in which position it remains until readjusted by design. This protruding position of the indicating pin is visual evidence to the person in charge of the machine that the softened tire, which resulted in the explosion of the cap and the giving of the signal, belongs to a particular wheel. This is an important feature, since the audible signal will not usually indicate to the chauffeur with sufficient accuracy the particular wheel containing the partially deflated tire.

In order that the force of the cap explosion may act upon the indicating pin, the firing-pin is provided with a longitudinal perforation 45 which is in communication with the bore 63 in which the indicating pin is located. When the indicating pin is in its inward position (see Figs. 1 and 6) its head or outer extremity 46 is countersunk in a recess 47 formed in the outer extremity of the plug 42, thus giving the outer extremity of the plug normally a smooth and uninterrupted surface, the exposed extremity of the plug being preferably rounded as shown at 48.

From the foregoing description, the use and operation of my improved tire-pressure-indicator and signal will be readily understood.

When the inner tube 21 has the normal or predetermined degree of air pressure, the hammer 26 is locked to prevent its movement to explode the cap, by the outer extremity of the rod 18 which engages the recess 61 of the dog 28 and holds the latter in such position that one of its extremities engages the opening 31 formed in the tube 5. This position of the dog prevents the movement of the hammer in response to the action of the spring 24 since the pressure of the spring on the hammer cannot actuate the latter without the movement of the dog in a lateral direction sufficiently to disengage the dog from the opening 31 of the tube, and this movement the dog cannot make as long as the outer extremity of the rod 18 engages the bottom of the recess 61, since the bottom of this recess is located slightly below the interior beveled face 32 of the dog. However, as soon as the pressure within the inner tube 21 is reduced sufficiently to allow the cap 20 to indent the tire (see Fig. 3) sufficiently to disengage the outer extremity of the rod from the recess 61 of the dog, the collar 22 will occupy a position in contact with the outer extremity of the nipple 14 of the head 13, thus preventing the further inward movement of the rod, the recoil action of the spring 24 which has been only slightly expended in causing inward movement of the rod, will act on the hammer to drive the latter forcibly outwardly in the tube, causing it to strike the cap 38 and explode the same (see Fig. 2). The force of this explosion, as heretofore explained, will act upon the indicating pin 44 to cause the latter to protrude beyond the outer extremity of the plug 42 of the tube. The noise resulting from the explosion of the cap will give an audible signal to the chauffeur, who, when he stops the machine and examines the different wheels, will know that the soft tire is on a particular wheel from the fact that the indicating pin 44 extends beyond the end of the plug 42 of the device on the wheel in question.

After the partially deflated tire has been restored to its normal condition, in order to re-set the hammer and prepare the device for a second signal, it is only necessary to unscrew the plug 42 and insert the shank 34 of the tool 33 in the open extremity of the tube 5 and force the hammer inwardly. As soon as the beveled face 32 of the dog 28 engages the outer extremity of the rod 18, continued inward pressure on the hammer will cause the dog to be thrust laterally into the opening 31 of the tube, simultaneously with the entrance of the outer extremity of the rod 18 to the recess 61. As soon as this occurs, the hammer will be locked in position against movement since the pressure within the inflated tube is sufficient to prevent the inward movement of the rod 18 which is necessary to release the hammer. In applying the device to the rim of a wheel, the tube 5 is clamped thereto between the nut 4 and the head 13, the nut being adjustable to maintain the tube securely in place.

In the construction shown in Figs. 1 to 4 inclusive, a demountable rim is employed. In the construction shown in Fig. 6, a so-called solid rim is used. In this case, the tire-holding member 50 of the rim is permanently secured to the member 51 thereof, whereby the tire-holding member is not readily removable as in the other form of construction. The only difference in the construction of my improved device when employed on the rim shown in Fig. 6, consists in the fact that the tube 5 may have an integral head 52 instead of a detachable head 13, as shown in the other forms of construction. In the construction shown in Figs. 1 to 4 in order to remove the demountable member 9 of the rim, the tube 5 must be disconnected from the head 13 by unscrewing the one part from the other. When this is done, the member 9 may be disconnected from the body of the rim by a lateral movement, the head 13 of the tube remaining in the demountable rim-member. It will be understood that when the tube 5 is removed to permit the demounting of the rim-member 9, the rod 18 will also be unscrewed from its cap 20. When this is done, the removal of the member 9 of the rim is not obstructed in any way by my improved device. Where the form of construction shown in Fig. 6 is employed, the tube 5 will be inserted in the rim before the tire is put on and from the side where the tire is to be located. The head 52 is practically countersunk in an opening 53 of the rim member 50. The tube may then be secured tightly in place by adjusting the nut 4.

It is evident that in order to keep the dog 28 constantly in alinement with the socket 31 in the tube it is necessary to provide some means for preventing the hammer 27 from turning. For this purpose I have formed a tongue 59 upon the hammer and a groove 60 of counterpart shape running longitudinally throughout a portion of the length of the tube 5. See Fig. 5.

Having thus described my invention, what I claim is:

1. In a tire-pressure signal, the combination with a wheel-rim and tire, of a tube mounted on the rim, a tire-engaging member mounted in the tube and capable of a limited degree of movement toward the tire, a hammer also mounted in the tube, a spring interposed between the said member and said hammer, means governed by the said member for locking the hammer against movement when the tire is under normal predetermined pressure, and for releasing the hammer when the said member moves due to a reduction of tire pressure, and means located in the tube and acted on by the released hammer for producing a signal.

2. The combination with a wheel-rim and tire of a tube mounted on the rim, a member located in the tube having one extremity in engagement with the tire and capable of a limited degree of movement toward the tire when the normal pressure of the latter is reduced, a hammer also located in the tube, a spring interposed between the said hammer and the said member, a dog carried by the hammer and engaged by a part of said member for locking the hammer against movement when the said member is held against movement toward the tire by the normal tire-pressure, said dog being released and unlocking the hammer when the tire-engaging member moves toward the tire, and means located in the tube and acted on by the released hammer for producing a signal, substantially as described.

3. The combination with a wheel-rim and tire of a tube mounted on the rim and open at its extremity nearest the tire, a member carried by the tube and having one extremity in engagement with the tire, the said member having a limited degree of movement toward the tire when the normal pressure of the latter is reduced, a hammer also located in the tube, a spring interposed between the tire-engaging member and the hammer, the tension of the spring being less than the normal predetermined pressure of the tire, a dog carried by the hammer and movable to engage an opening formed in the tube whereby the hammer is locked against movement, the said dog having a recess which is engaged by one extremity of the tire-engaging member when the tire is under normal pressure, said dog being released and the hammer unlocked when the tire-engaging member moves toward the tire, a firing-pin located in the tube and an explosive cap carried by the pin and adapted to be acted on by the released hammer, substantially as described.

4. The combination with a wheel-rim and tire, of a tube mounted on the rim, a rod located in the tube and having one extremity in engagement with the tire, a hammer also located in the tube, a spring interposed between the tire-engaging rod and the hammer, means adapted to be acted upon by the extremity of the rod remote from the tire for locking the hammer against movement when the rod is held against movement toward the tire by the pressure of the latter, a firing-pin located within the tube and arranged in the path of the hammer when the latter is released, an explosive cap mounted on the said pin, said tube having an opening in its free extremity and an indicating pin mounted in the tube and adapted to protrude under the force of the cap's explosion, substantially as described.

5. The combination with a wheel-rim and tire of a tube mounted on the rim, a rod located in the tube and having one extremity in engagement with the tire, a hammer also mounted in the tube, a spring interposed between the rod and hammer, means acting in conjunction with the rod for locking the hammer against movement when the tire is at a normal predetermined pressure, and for releasing the hammer when the said rod moves toward the tire due to a reduction in the pressure of the latter, and signaling means located in the tube and arranged to be acted on by the hammer as the latter is released, substantially as described.

6. The combination with a wheel-rim and tire of a tube mounted on the rim, a rod carried by the tube and having one extremity in engagement with the tire, the rod being capable of a limited degree of movement toward the tire when the normal pressure of the latter is reduced, a hammer also located in the tube, the hammer having a hollow stem which the tire-engaging rod enters, a dog located in the head of the hammer and laterally movable, the said dog having a recess adapted to receive the other extremity of the rod, the tube having an opening one wall of which is beveled and the dog having a coöperating beveled face, a spring surrounding the hollow stem of the hammer, one extremity of the spring acting on the rod while the other extremity acts on the hammer, and means located in the tube and located in the path of the hammer when released for producing an alarm, substantially as described.

7. The combination with a wheel-rim and tire of a tube mounted on the rim, one extremity of the tube having a head engaging the rim on the tire side, a nut applied to the tube and engaging the rim on the opposite side whereby the tube is clamped to the rim, a member located within the tube and having one extremity in engagement with the tire, a hammer also located in the tube, a spring interposed between the said member and the said hammer, means acted upon by the said member for locking the hammer against movement when the tire is under a normally predetermined pressure, and for releasing the hammer when the said member moves toward the tire, due to a reduction of the latter's pressure, a plug applied to the outer extremity of the tube and having a longitudinal perforation, a firing-pin carried by the plug and adapted to receive an explosive cap located in the path of the released hammer, and an indicating-pin located in the perforation of the plug and arranged to be acted on by the explosive force of the cap, whereby the indicating pin is caused to protrude from the plug under the force of the cap's explosion, substantially as described.

In testimony whereof I affix my signature in presence of two witnesses.

CHARLES C. CLEVELAND.

Witnesses:
 A. J. O'BRIEN,
 A. E. ADAMS.